Aug. 12, 1958  C. O. SOHLBERG ET AL  2,847,095
SPEED GOVERNOR, PARTICULARLY FOR DIALS
Filed June 19, 1956
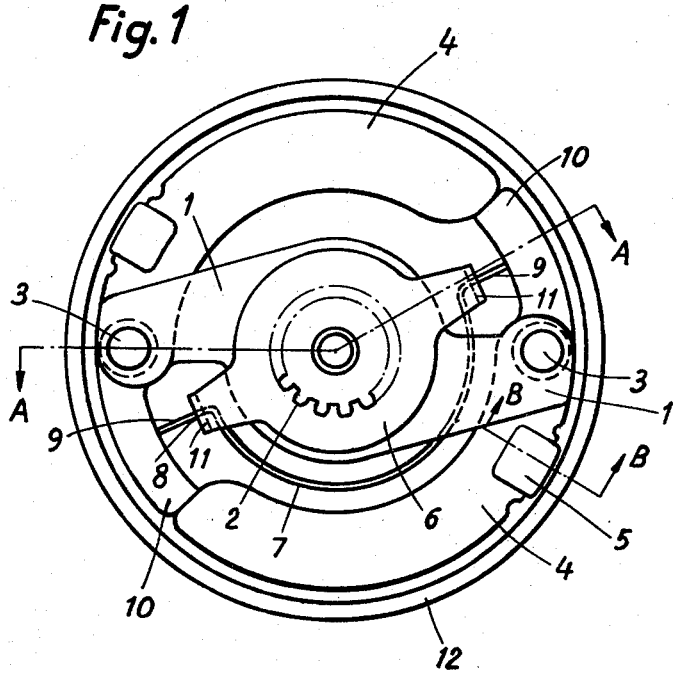
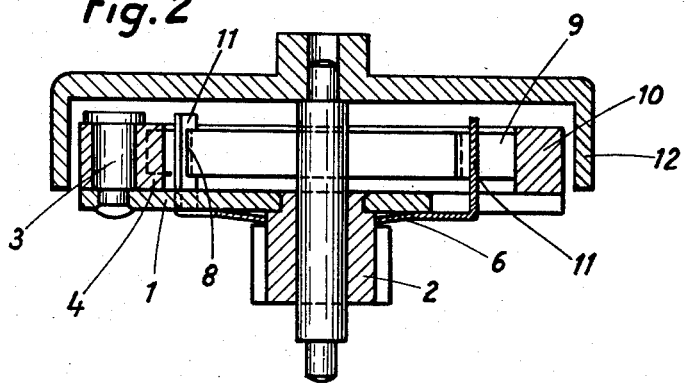
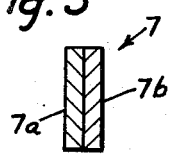
INVENTORS
CARL OSCAR SOHLBERG
HANS GÖSTA THAMES
BY Hane and Nydick
ATTORNEYS

United States Patent Office 2,847,095
Patented Aug. 12, 1958

2,847,095

SPEED GOVERNOR, PARTICULARLY FOR DIALS

Carl Oscar Sohlberg, Stockholm, and Hans Gösta Thames, Hagersten, Sweden, assignors to Telefonaktiebolaget L M Ericsson, Stockholm, Sweden, a corporation of Sweden Application June 19, 1956, Serial No. 592,305

Claims priority, application Sweden July 29, 1955

2 Claims. (Cl. 188—184)

This is an improvement of the structure disclosed and claimed in my co-pending application Serial Number 478,104, filed December 28, 1954, now U. S. Patent No. 2,779,444, dated January 29, 1957, which refers to a speed governor, particularly for dials, with two brake weights which are situated diametrically and are shaped as levers with prolongations on the other side of the supporting pins of the brake weights. The brake weights being influenced by the centrifugal force swing outwards towards a brake sleeve, when the dial has a certain speed, said speed being determined by a pressure spring the ends of which rest against the prolongations of the two brake weights, so that the spring will be supported between said prolongations with a power counteracting the centrifugal force. The speed of the dial, however, depends upon the temperature of the environment, as the friction in bearings and other sliding surfaces increases when the temperature falls owing to the increasing viscosity of the lubricant. The object of the present invention is to improve this construction in such a way that the speed of the dial will be almost independent upon the temperature of the environment. According to the invention this is achieved by the pressure spring being made in bimetal with such properties dependent on the temperature, that the pressure against the prolongations of the two brake weights increases while the temperature falls, so that the braking power decreases, when the friction increases in bearings and sliding surfaces, the speed of the dial being nearly constant at different temperatures.

The invention will be more closely explained with reference to the attached drawings showing an example of the application of the invention.

Fig. 1 shows an enlarged top plan view of a governor, and Fig. 2 is a view in transverse section of the governor along the cut A—A in Fig. 1, and Figure 3 is an enlarged cross sectional view of the bimetallic spring member.

The embodiment shown on the drawing of Figs. 1 and 2 entirely corresponds to that described in the principal patent Figs. 1 and 2. As to the details 1–12 in these figures we refer to the description in the principal patent. In the following, only that part of the operating manner of the governor will, thus, be described which refers to the bimetal spring.

According to the principal patent the ends 9 of the pressure spring 7 are arranged to rest against the prolongations 10 of the brake weights 4. Said pressure spring consists of a semicircular plate spring 7, the two ends 9 of which are radially shaped. According to the present invention said pressure spring is shaped in the same way, but it is made of bimetal. The spring consists of two material layers 7a, 7b. The one layer 7a extending along the outer side of the semicircular part has a rather high coefficient of expansion, whereas the other layer 7b at the inner side of the semicircular part has a low coefficient of expansion. The outer layer may for instance consist of 20% nickel, 60% manganese and 20% iron. The other layer may for instance consist of 36% nickel and 64% iron.

With this embodiment the bimetal spring has such properties dependent on the temperature, that it tends to stretch when the temperature falls. The pressure against the two brake weights 10 thus increase while the temperature falls. As said pressure strikes the prolongation of the brake weights, the braking power decreases while the temperature falls. Owing to the viscosity of the lubricant the friction in bearings and sliding surfaces increases while the temperature falls. By means of the bimetal spring such a compensation can be obtained, that the speed of the dial will be constant or nearly constant independent on the temperature of the environment, for instance within the temperature interval +70 to —45° centigrade.

We claim:

1. A speed governor comprising, in combination, a substantially circular brake sleeve, a body portion rotatably supported within said sleeve, a pair of brake weights each comprising a lever having a brake sleeve engaging portion and an extension, pivot means disposed between said sleeve engaging portion and said extension pivotally supporting said lever on said body portion, a spring support plate rotatably supported within said sleeve, temperature responsive bimetallic spring means slidably received within said support plate and disposed in adjustable engagement between each extension of each said levers, a temperature responsive lubricant acting between relatively movable elements of said governor, the pressure of said bimetallic spring member against said lever extensions increasing in response to a decrease in temperature to reduce the braking action of said brake weights and said brake sleeve as the resistance to movement between said relatively movable parts increases due to the increase in viscosity of said lubricant.

2. A speed governor as set forth in claim 1, wherein said bimetallic spring means comprises a semi-circular portion and opposite end portions, each one of said end portions being in engagement with one of said levers, said semi-circular portion comprising an inner and an outer layer of different materials integrally secured together, said outer layer having a higher coefficient of expansion than the coefficient of expansion of said inner layer.

References Cited in the file of this patent

UNITED STATES PATENTS 2,779,444    Sohlberg _____ Jan. 29, 1957